July 2, 1968  A. STICHHAN  3,390,891

TUBE HOLDER FOR TUBE FILLING AND CLOSING MACHINES

Filed Feb. 16, 1967  5 Sheets-Sheet 5

3,390,891
TUBE HOLDER FOR TUBE FILLING AND CLOSING MACHINES
Albert Stichhan, Karlsruhe, Baden, Germany, assignor to Industrie-Werke, Karlsruhe Aktiengesellschaft, Karlsruhe, Baden, Germany, a corporation of Germany
Filed Feb. 16, 1967, Ser. No. 616,558
Claims priority, application Germany, Feb. 25, 1966, J 30,168
9 Claims. (Cl. 279—23)

ABSTRACT OF THE DISCLOSURE

The tube holder comprises two telescoping annular members of which the inner one is provided with circumferentially spaced axially extending bars for yieldably engaging a tube, while the outer annular member is provided also with axially extending bars the free ends of which have inwardly extending projections extending through apertures provided between the bars of the inner annular member adjacent the ends thereof which are connected with said inner annular member. Axially spaced circular helical springs surround the two groups of bars to urge the same radially inwardly.

---

The invention relates to a tube holder for tube filling and closing machines provided with a receptacle formed by holding jaws for the temporary holding and positioning of tubes to be filled and closed.

A tube holder for such machines is known which consists of a tubular metal holder, the circumferential wall of which has a number of circumferentially spaced elongated slits of which each one is adapted to receive a removable and exchangeable clamping member. The clamping members are supported by a closed annular helical spring which surrounds the outside of the holder within a groove as well as the backsides of the clamping members. In this construction merely the clamping members positioned in the slits of the holder are movable while the bars arranged adjacent the slits are rigid like the holder itself because they are part of it and are therefore stationary. This has the result that one half of the elements arranged on the circumferential surface of the receptacle for the tubes is rigid and the other half is movable. In other words, there is alternately circumferentially arranged a rigid bar adjacent a movable clamping member. This has the disadvantage that the filled tubes as they are being closed are compressed in the region of the receptacle and the tube section assumes in the region of the tube holder an increasingly tapered elliptical configuration toward the top resulting in a deformation of the tube. Particularly small tubes are subject to such deformation. The cause of this tube deformation are the alternately rigid and flexible parts on the circumference of the receptacle. While the flexible parts adapt to the shape of the tube as closed, the rigid parts cannot withdraw so that they cause the deformation of the tube which is most pronounced at those points of the elliptical shape that are farthest apart.

These disadvantages are eliminated by the present invention whose object it is to produce a tube holder which maintains a uniform diameter for small and big tubes alike without deforming these tubes.

This is accomplished according to the invention in that the holding jaws of the tube holder are constructed in the form of two annular members exchangeably telescoped in a sleeve and forming an inner and an outer annular member, whereby their bars surrounding the receptacle are pivotally and radially resiliently mounted. Since in this construction contrary to prior ones all bars projecting into the receptacle are pivotally mounted and adapted to recede somewhat from the pressure exerted by a tube being inserted, any deformation of the tube, which assumes an elliptical shape during the closing operation, is safely prevented. In this manner well-made tubes of a pleasing appearance can be presented to consumers so that complaints about deformation of tubes are not likely to occur.

According to the invention, the bars of the inner annular member are separated by axially equidistantly arranged slits and are provided with recesses directed toward the inner annular member. The bars of the inner annular member form the receptacle which due to the movability of the bars in the slits adjusts automatically to the changing circumference of the tube in that one part of the bars recede a little more than the other part as soon as the tubes assume an elliptical shape in the closing procedure.

The invention is further characterized by a groove-like depression extending along the periphery of the bars of the inner annular member, whereby each individual bar is resiliently mounted and so shaped that its thickness decreases toward the receptacle. The groove-like circumferential channel on the bars receives an annular spring which holds the bars tightly together so that their free ends are close one next to the other to form a centric receptacle. In order to assure a satisfactory engagement of the tubes in the receptacle formed by the bars, an adaptation of the bars to the circumference of the tube is necessary. For this purpose the diameter of the bars becomes smaller toward the receptacle so that the bars and the tube are mutually complementary with respect to their contours as soon as the tube is completely surrounded by the bars.

According to the invention, the bars form a unit with the inner annular member which is provided with a circular bead, whereby the individual bars extend toward the receptacle. This construction assures a quick exchange of the annular member for another one in the event the bars in the course of time lose their engaging force by the continuous moving in and out of tubes because a satisfactory holding of the tubes is then no longer assured.

The invention provides further an equal number of bars in the outer annular member and in the inner annular member, and these bars are circumferentially spaced and fixedly engage the annular member to form a unit with it, whereby the bars of the outer annular member having a circular bead extend toward the inner annular member and surround the bars of it. In order to also exchange the outer annular member readily, its bars—just like the inner annular member—form a unit with it. In contrast to the bars of the inner annular member, however, the bars of the outer annular member are not separated by slits but the individual bars are spaced a distance which is a multiple of the width of the slits. This relatively large distance between the individual bars is due to the fact that only the free ends of the bars form the receptacle so that a close juxtaposition of the bars as on the inner annular member is not necessary.

Another feature of the invention is that each individual bar of the outer annular member is resiliently mounted and has a reinforcement or projection at its free end and these projections are in movable engagement with openings formed by recesses in the bars of the inner annular member. This has the effect that the tube is centered and held fast in the region of its screw cap. The projections at the ends of the bars are moved outwardly somewhat when the tube is inserted so that they completely surround the tube during the subsequent filling and closing process.

The outer periphery of the projections is engaged by an annular spring exerting a certain pressure on the projections which is transferred to the tube when it is being held.

The sleeve receiving the inner and the outer annular member is provided with annular grooves to be engaged by the beads of the annular members.

The invention will be described in further detail with reference to the accompanying drawings in which.

Figure 1:
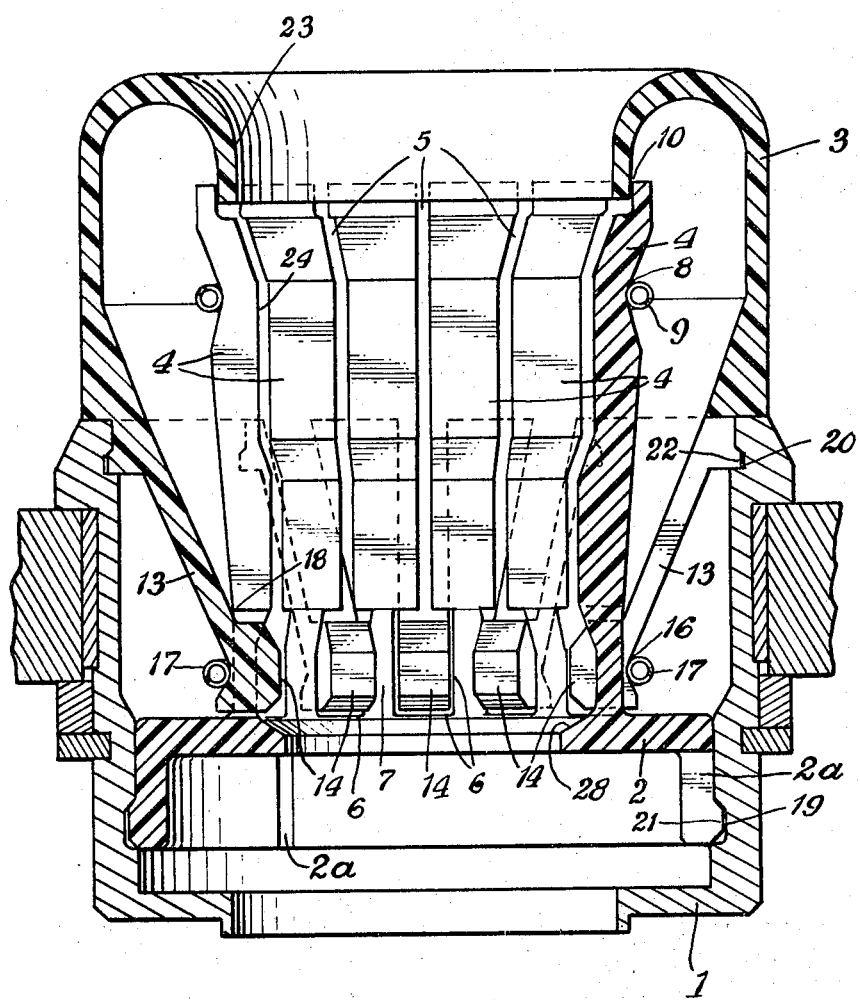
FIG. 1 is a partly sectional view of a tube holder in operative position.

Referring to FIG. 1, the tube holder consists of a mounting sleeve 1 and an inner annular member 2 and an outer annular member 3 which are telescoped and exchangeably mounted in the sleeve 1. From the inner annular member 2 extend axial projecting bars 4 separated by equidistantly arranged axial slits 5. The lower ends of the bars 4 attached to the annular member 2 are provided with recesses 6 so that each bar terminates in a narrow cross bar 7 which is connected to the annular member. The bars 4 are provided at the upper ends on their periphery with a circumferential groove-like depression 8 in which an annular helical spring 9 is positioned for pushing the bars 4 radially together so that the same engage the upper free end of the annular member 3, as illustrated at 10 in FIG. 1, and thereby form combined a radially resilient receptacle 11 (FIG. 2) for the temporary holding and storing of tubes 12 to be filled and closed.

The outer annular member 3 is likewise provided with bars 13 forming a unit with the member 3 and being of the same number as the bars 4 of the inner annular member 2. The bars 13 extend downwardly from the outer annular member 3 and surround the bars 4 of the inner annular member 2 and with their projections 14 on their lower free ends engage the openings produced by the recesses 6 on the bars 4 of the inner annular member 2. Around the lower ends of the outer bars 13 of the outer annular member 3 extends a circumferential groove 16 for receiving an annular helical spring 17 which urges the bars 13 against the outer lower edges 18 of the bars 14 of the inner annular member 2. The mounting sleeve 1 is further provided with axially spaced inner grooves 19 and 20 which are engaged by an outer bead 21 of the inner annular member 2 and an outer bead 22 of the outer annular member 3, respectively. The downwardly extending flange on the annular member 2 is provided with axial slots 2a to render the flange yieldable.

Figure 2:
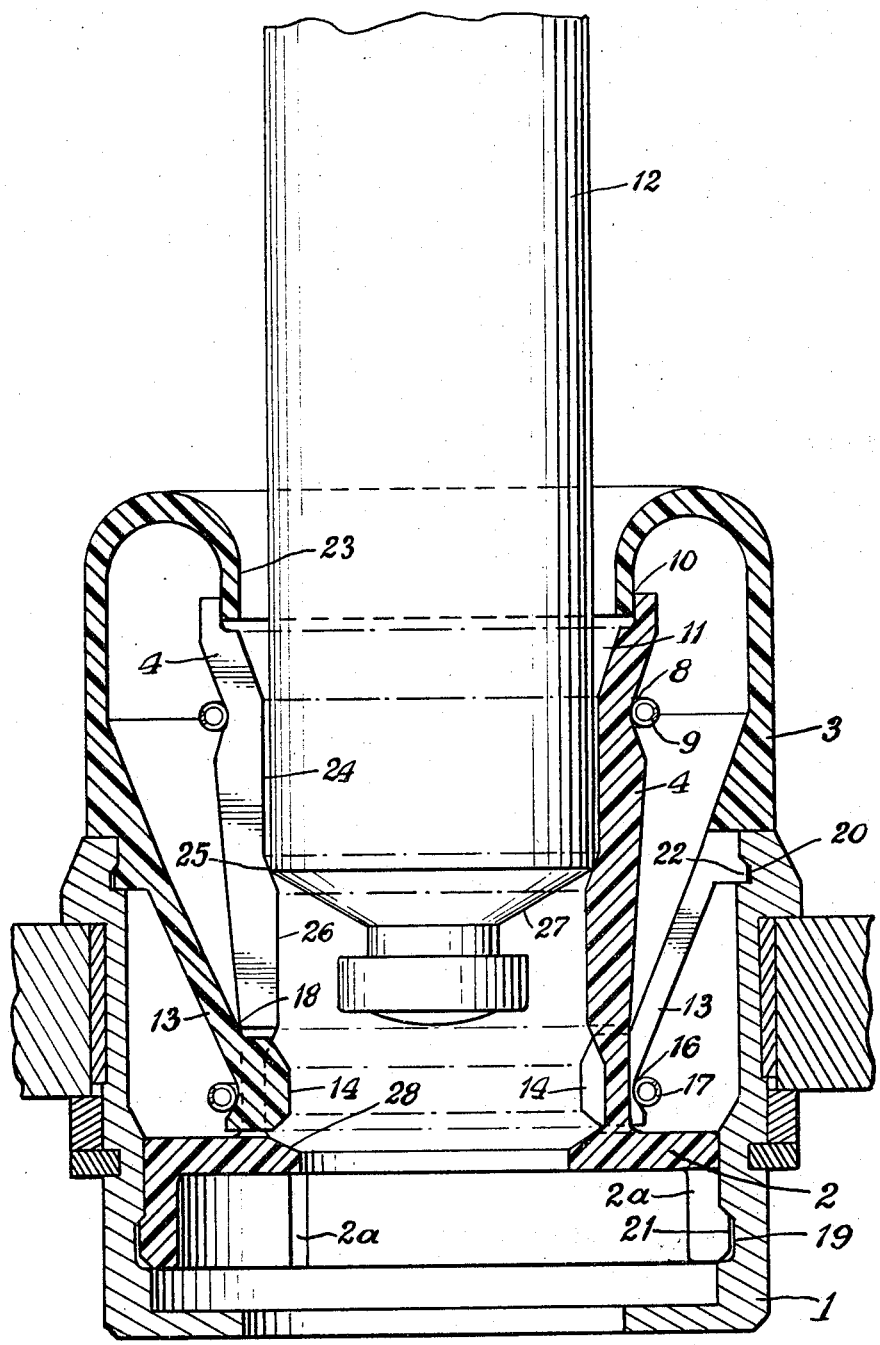
FIG. 2 illustrates the tube holder of FIG. 1 with a tube lightly held and guided in the upper region of the holder.

The tube holder operates as follows:

As is shown in FIG. 1, the receiving space of the tube holder has a smaller diameter than the tube because the annular springs 9 and 17 press the bars 4 and 13 radially together so that they are in a pretensioned position. The inner walls of the outer annular member 3 and the bars 4 of the inner annular member 2 form openings at 23 and 24 of such a dimension that a tube 12 dropping by gravity from a not illustrated chute into the tube holder is held already so well that it can be conveyed to the next phase. This position is shown in FIG. 2 in which the tube 12 is engaged by a tapered wall portion 25 provided by the bars 4 of the inner annular member 2 so that the tube is prevented from slipping out of the tube holder and may be conducted safely to the next station.

Figure 3:
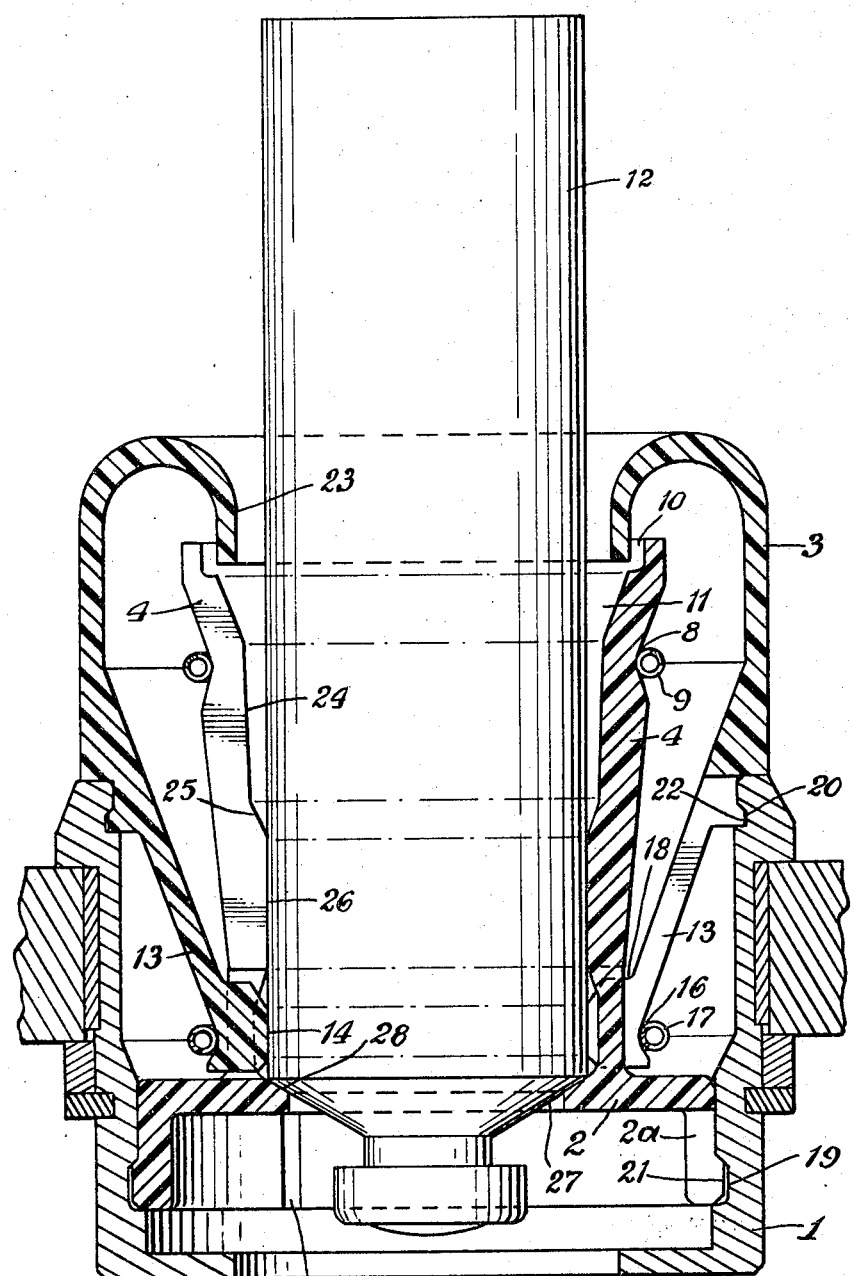
FIG. 3 illustrates the tube holder of FIG. 1 with a tube completely inserted in the holder.

In this next station the tube 12 is advanced farther down the tube holder by a not illustrated pushing device so that the tube 12 is now in the position illustrated in FIG. 3. In being inserted in the tube holder, the tube 12 has thrust the bars 4 and 13 outwardly, as will be clearly seen from the circumference of the enlarged opening 23 of the outer annular member 3. In order to assure a firm grip for the tube 12, the same engages a surface 26 of the bar 4 as well as the projections 14 on the bars 13. The tube 12 is further supported at its tapered shoulder 27 by the tapered wall portion 28 of the inner annular member 2. By the engagement of the tube 12 at several places in the tube holder, a safe hold of the tube is assured so that a shifting or tilting during label alignment or conveying of the tube to subsequent stations is made impossible.

Figure 4:
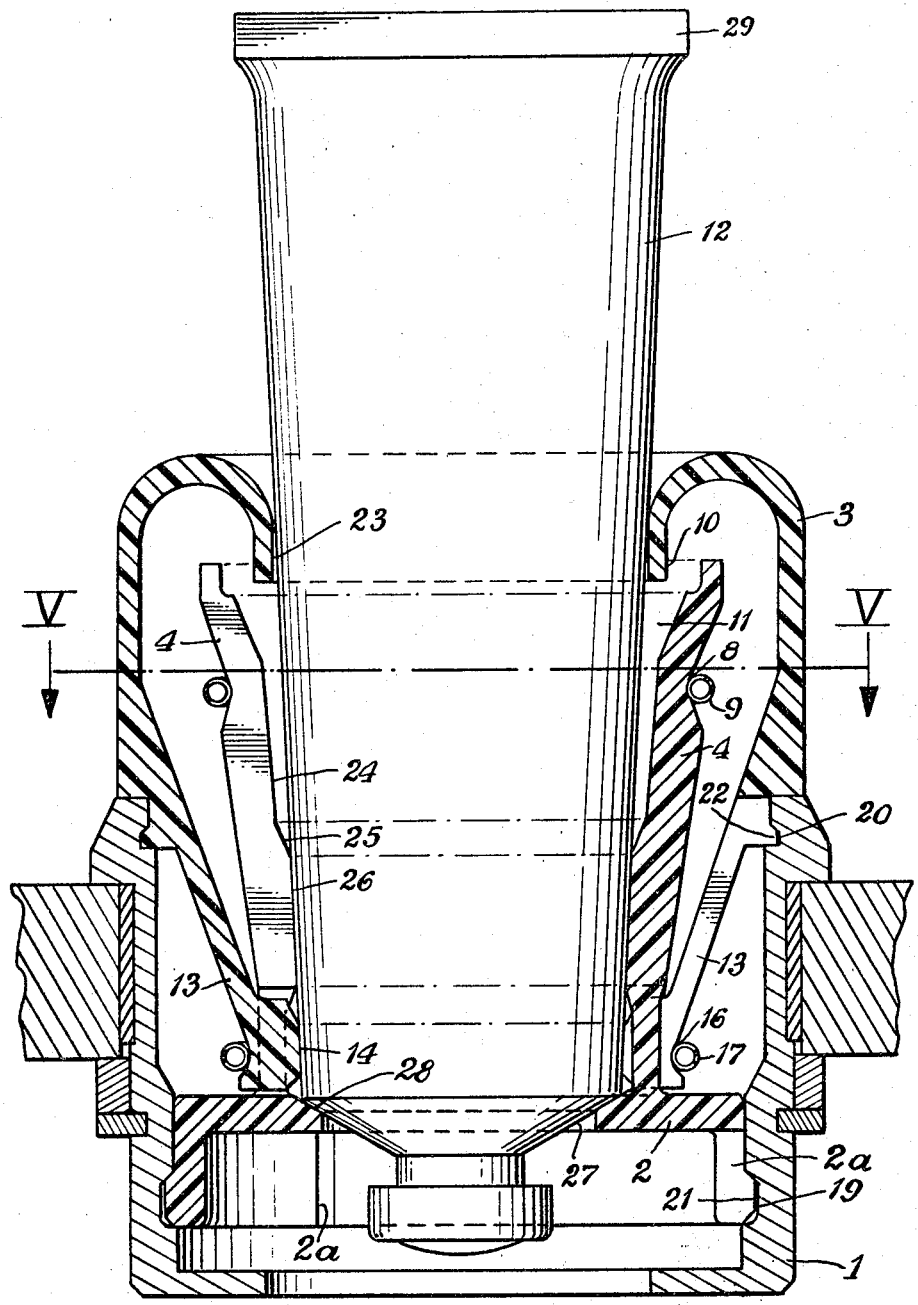
FIG. 4 illustrates the tube holder of FIG. 1 with a tube closed by folding.
Figure 5:
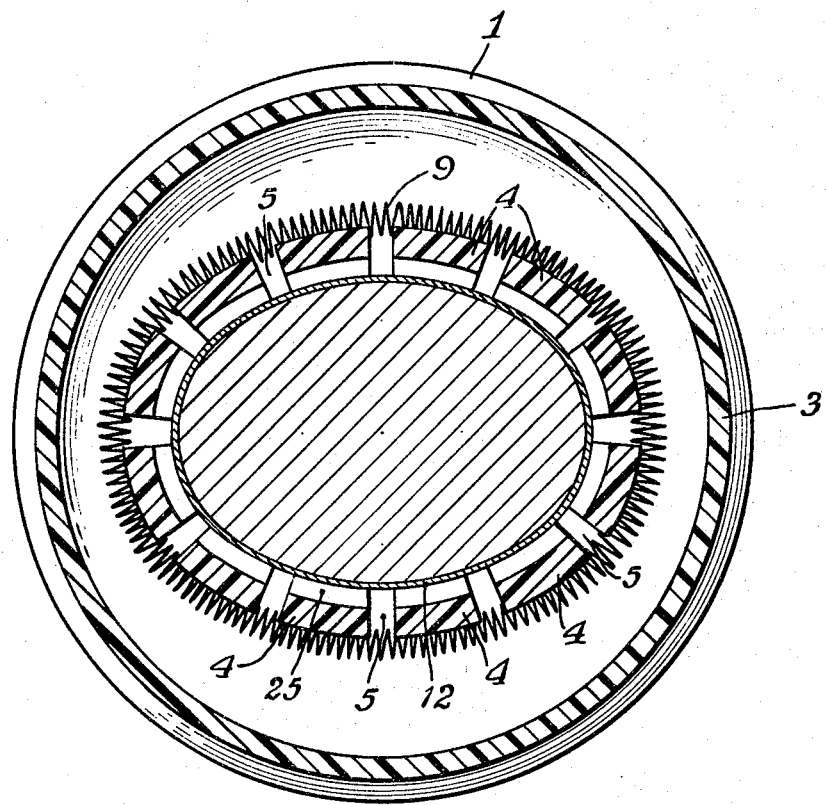
FIG. 5 is a cross-sectional view along the line V—V of FIG. 4.

After the tube has been filled with the desired material, it is closed in the next station. In this closing process the tube is subjected to a deformation which increases toward the folded tube end 29. As is shown in FIG. 4, a flat fish-tail shaped form is produced and the cross-section of the tube becomes increasingly elliptic from the region in the tube holder toward the upper closed end of the tube. The bars 4 and 13 holding the tube 12, or the receptacle formed by these bars respectively, adjust to the changing form of the tube by the pressure exerted on them by the annular springs 9 and 17 so that the tube is always and in every position supported over its entire circumference. FIG. 4 shows that the upper free ends of the bars 4 in the range of the widened opening 23 on the outer annular member 3 do no longer engage the outer circumference of the annular member 3, as in FIG. 2, but they are urged still farther outwardly in contrast to FIG. 3. The tube 12 now having in part an elliptical shape not only is held, as in FIG. 3, by the area 26 of the bars 4 and the projections 14 of the bars 13, but in addition thereto it may also engage the inner circumference of the upper enlarged opening 23 of the outer annular member 3. FIG. 5 illustrates that the bars 4 are now adapted to the changed form of the tube 12 which is now elliptical, and that the bars surround the tube 12 completely so that it is firmly positioned in the tube holder.

The tube holder according to the invention is made of plastics and is therefore lightweight which has the substantial advantage that for operating the tube filling and closing machine a simple drive mechanism is sufficient. Also, the initial investment for a plastics tube holder is less than for a tube holder made of metal which is, moreover, of a considerable weight. The novel construction of the tube holder makes an adjustment to different sizes of tubes possible within the shortest time. As is known, plastics tend to change under the influence of humidity, but owing to the resiliency of the annular members of the tube holder any such change does no longer adversely affect the operation of the tube holder.

What I claim is:

1. A tube holder for tube filling and closing machines having a receptacle for the holding and positioning of the tubes to be filled and closed, said receptacle being formed by two telescopically connected annular members each of which being provided with holding jaws, a mounting sleeve for supporting said inner and outer annular member, said holding jaws being formed by axially extending yieldable bars integrally formed with said annular members.

2. A tube holder according to claim 1, in which the axially extending bars of said inner annular member are separated from each other by equidistantly spaced and axially extending slits.

3. A tube holder according to claim 1, in which the axially extending bars of said inner annular member are separated from each other by equidistantly spaced and axially extending slits, and that the ends of said bars are provided with recesses which are connected to said inner annular member.

4. A tube holder according to claim 1, in which the bars of said inner annular member are provided adjacent their free ends and at their outer faces with a circumferential groove-like depression for the reception of a circular spring.

5. A tube holder according to claim 1, in which each individual bar of said inner annular member is resilient and so constructed that its thickness decreases toward the interior of the receptacle.

6. A tube holder according to claim 1, in which the inner annular member is provided with an outer circular bead engaging an inner circumferential groove provided in said mounting sleeve.

7. A tube holder according to claim 1, in which the number of the bars of the outer annular member is equal to the number of bars of said inner annular member, whereby the bars of said outer annular member are circumferentially spaced along said inner annular member.

8. A tube holder according to claim 1, in which the bars of said outer annular member have an outwardly extending projection forming a circular bead engaging an inner circumferential groove provided in said mounting sleeve.

9. A tube holder according to claim 1, in which each individual bar of said outer annular member is provided at its free end with a projection extending through an aperture formed between each two of the bars of said inner annular member.

References Cited

UNITED STATES PATENTS

| | | | |
|---|---|---|---|
| 3,089,707 | 5/1963 | Laux | 279—23 |
| 3,147,018 | 9/1964 | Reichert | 279—35 |
| 3,248,121 | 4/1966 | Volpe | 279—23 X |

CHANCELLOR E. HARRIS, *Primary Examiner.*